United States Patent
Berwanger

(10) Patent No.: US 7,991,597 B2
(45) Date of Patent: *Aug. 2, 2011

(54) APPARATUS AND METHOD FOR CREATING SCALED, THREE-DIMENSIONAL MODEL OF HYDRAULIC SYSTEM TO PERFORM CALCULATIONS

(75) Inventor: Patrick C. Berwanger, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/565,878

(22) Filed: Sep. 24, 2009

(65) Prior Publication Data

US 2010/0010785 A1   Jan. 14, 2010

Related U.S. Application Data

(63) Continuation of application No. 10/935,695, filed on Sep. 7, 2004, now Pat. No. 7,624,002.

(51) Int. Cl.
*G06G 7/48* (2006.01)
(52) U.S. Cl. .................. 703/6; 703/9
(58) Field of Classification Search ............. 703/6, 9
See application file for complete search history.

(56) References Cited

U.S. PATENT DOCUMENTS

| 4,992,953 | A | 2/1991 | Yoshida et al. |
| 5,299,297 | A | 3/1994 | Reynolds et al. |
| 5,371,845 | A | 12/1994 | Newell et al. |
| 5,740,341 | A | 4/1998 | Oota et al. |
| 5,774,372 | A | 6/1998 | Berwanger |
| 6,778,871 | B2 | 8/2004 | Holman et al. |
| 7,624,002 | B2 * | 11/2009 | Berwanger ............... 703/6 |

OTHER PUBLICATIONS

"Visual Flow" obtained from http://www.simsci-esscor.com, generated Aug. 20, 2004, 3 pages.
Simulation Sciences, Inc., "Visual Flow—Design and Modeling of Safety Systems and Pressure Relief Networks," dated 2000, 4 pages, obtained from http://www.simsci-esscor.com.

(Continued)

*Primary Examiner* — Kamini S Shah
*Assistant Examiner* — Herng-Der Day

(57) ABSTRACT

A software application implementable on a computer system is used to create a model of a hydraulic system to perform calculations. The user visually constructs a two-dimensional (2-D) connectivity model in the computer system. The 2-D connectivity model has a plurality of node points defined at various elements (sources, outlets, equipment, and junctions) of the hydraulic system and has segments interconnecting the node points. The user visually constructs a three-dimensional (3-D) segment model for each segment so that each segment model has the 3-D layout of the piping and the fittings for the segment. A 3-D system model of the entire hydraulic system is visually created in the computer system by combining the 3-D segment models. The software application performs calculations using the 3-D system model, and the 3-D system model can be visually or automatically verified to determine whether the model substantially corresponds to the 3-D layout of the hydraulic system, and has been laid out without errors.

18 Claims, 8 Drawing Sheets

OTHER PUBLICATIONS

Simulation Sciences, Inc. "Visual Flow—Version 4.1", downloaded Sep. 6, 2004, 2 pages, http://www.simsciesscor.com.

"Example 1" from on-line training of Pressure Protection Management software by Berwanger, Inc., Copyright 2003, 19 pages.

"Hydraulic Solver" from on-line training of NetMaster 1.0 software by Berwanger, Inc., Copyright 2003, 9 pages.

Berwanger, Inc., "Pressure Protection Manger User's Guide, Version 27", Jan. 1, 2002, 357 pages, Berwanger, Inc.

Berwanger, Inc., "Pressure Protection Manger User's Guide, Version 28", Jan. 1, 2004, 362 pages, Berwanger, Inc.

Visual Flow 4.1 User's Guide:, Invensys System, Inc., Mar. 2003, pp. 1-204.

* cited by examiner

APPARATUS AND METHOD FOR CREATING SCALED, THREE-DIMENSIONAL MODEL OF HYDRAULIC SYSTEM TO PERFORM CALCULATIONS

CROSS-REFERENCE TO RELATED APPLICATIONS

This application is a continuation of application Ser. No. 10/935,695 filed Sep. 7, 2004 which claims the benefit of and is hereby incorporated by reference.

FIELD OF THE INVENTION

The subject matter of the present disclosure generally relates to an apparatus and method for creating a scaled three-dimensional model of an entire, multi-segmented hydraulic system useful in performing hydraulic calculations.

BACKGROUND OF THE INVENTION

Referring to FIG. 1, an exemplary hydraulic system 10 having fittings, piping, and equipment is schematically illustrated. In one example, the hydraulic system 10 can be a relief system, such as used for a flare stack in a chemical plant. Thus, the present example of the hydraulic system 10 has pressure vessels 12, relief valves 16, a knockout drum 13, and an elevated flare stack 18 interconnected by piping 14 and junctions 15. The relief valves 16 discharge overpressure from the vessels 12 to the knockout drum 13 and elevated flare stack 18 in the event of an overpressure contingency. Of course, such systems 10 are typically more complex than illustrated in the example of FIG. 1 and will have a number of elements which are not shown but which would be present to circuit the piping 14 in an actual implementation.

During a hydraulic analysis, a user performs hydraulic calculations to determine pressure drops, flow rates, or other hydraulic parameters that may occur in the system 10 under various conditions. As a first step in the analysis process, a user typically starts with an isometric drawing or blueprints of the system 10 to be analyzed, and inputs that system into a software application to provide further details relevant to modeling the system that may not be reflected in the isometric drawings alone. Such an isometric drawing is typically created with a three-dimensional (3-D) drawing program, such as AutoCAD, and information from the isometric drawing is usually entered into the software application by a user by hand, although the start drawing could also be conceivably be loaded into the software application even if it lacks some information pertinent to the subsequent modeling of the system.

In particular, 3-D information concerning the size and orientation of piping, fitting, equipment, etc. is entered into the software application because such information is important to accurately model the hydraulics. Additionally, information concerning the expected hydraulic operation and limits of the various elements is entered into the software application, and to the extent that a particular element has already been modeled and entered into the software application, it can be retrieved from a library of elements. For example, information concerning the trip pressure for a relief valve 16 would be entered into the software application, and/or would already be stored in the application for ready retrieval by a user.

Various software applications of the type described above for creating a model of a system 10 are known in the art such as Visual Flow™, Flare Net, and Tri-Header, which are all incorporated by reference herein. Another software application is Pressure Protection Manager™ by Berwanger, Inc. disclosed in U.S. Pat. No. 5,774,372, which is incorporated herein by reference.

To create the model for performing the hydraulic calculations in the software application, the system 10 is divided into primary elements of segments and node points. Using a node-segment convention known in the art for hydraulic calculations, node points (e.g., N1 to N7 in FIG. 1) are defined at particular elements in the process, and segments are defined as the collection of fittings (not shown) and piping 14 between the node points. The elements where node points are defined conventionally include sources (e.g., relief valves 16), outlets (e.g., elevated flare tip 18), junctions (e.g., tees 15), or pieces of network equipment (e.g., knockout drum 13).

Defining node points at these elements in the system 10 is required for performing the hydraulic calculations. For example, a junction 15 must be defined as a node point because the hydraulic calculations must resolve the mass flow rates and other variables occurring at the three openings of the junction 15. Similarly, sources and outlets must be defined as node points of the system 10 because the mass flow rates from all the sources must equal the mass flow rates to all the outlets. In addition, equipment, such as a relief valve, is conventionally defined as a node point because the fluid dynamics of such equipment can be complex and the equipment's characteristics for the hydraulic calculations are approximated. It may also be beneficial to define changes in orifice dimension, such as changes in pipe diameter or ANSI expansions, as node points.

Some prior art software applications require the user to create a model of the hydraulic system by manually entering information concerning node points (sources, outlets, equipment, and junctions) and segments (piping and fittings) into a tabular form. Because a hydraulic system can have hundreds of pieces of equipment, pipe lengths, fittings, etc., entering the information manually in tabular form is time consuming and prone to errors. To overcome these difficulties, prior art software applications such as those mentioned above allow a user to visually construct a model of the hydraulic system instead of using mere tables. Referring to FIGS. 2A-2B, interfaces 20 and 40 of a prior art software application, Visual Flow™ (also known as Visual Flare) by SimSci-Esscor, are illustrated. Using the first interface 20 of FIG. 2A, the user constructs a two-dimensional (2-D) system model 30 of the hydraulic system. Then, using the second interface 40 of FIG. 2B, the user constructs 3-D segment models of the segments of the hydraulic system.

In FIG. 2A, the first interface 20 includes a pallet 22 for constructing the 2-D system model 30 using tools 24 on a toolbar. The node-segment convention discussed above is used to construct the 2-D system model 30. Thus, node points are defined at conventional elements (e.g., sources 32, outlets 33, equipment 34, and junctions 36). In addition, segments (e.g., line 38) interconnect the node points and represent the piping and fittings of the system.

The tools 24 include buttons for adding nodes or segment to the pallet 22. To add a node element (e.g., source 32, valve 34, outlet 33, or junction 36), the user selects the desired node tool 25 and clicks on a location of the pallet 22 to add the node element. A dialog box (not shown) then allows the user to define aspects of the element, such as tag numbers, flow rates, pressures, etc., or again such information may already be populated in an element library and automatically retrieved. To add segments between node points, the user selects the segment tool 27 and connects the node points on the pallet 22 with an interconnecting line 38, which merely represents the connection between the node points and which (at this point)

lacks any details on the piping and fittings used or their orientations. In this prior art software application, the user does not define node points at changes in orifice dimensions, expansions, contractions, or changes in pipe diameters, and thus a given segment can include such features.

Once the 2-D system model 30 has been created, the user double clicks on a segment (e.g., line 38 in FIG. 2A) to bring the user to the second interface 40 of FIG. 2B. In this interface 40, the user constructs a 3-D segment model 46 of the segment, which, in short, allows the user to portray the actual physical layout of the segment in question (i.e., does it travel up or down, left or right, what sorts of fitting or elbows are used, etc.). The second interface 40 includes a pallet 42 for visually constructing the segment and includes tools 44 for selecting piping sizes and fitting types. After selecting a piping size, the user clicks at a starting point on the pallet 42 with the mouse pointer 41, and the starting node point (e.g., junction 36) of the selected segment is then displayed on the pallet 42. Using this 3-D view, the user moves the mouse pointer 41 in the required direction for the piping, which is represented by line 48 on the pallet 42. As the user moves the mouse pointer 41, a length dimension (not shown) is displayed adjacent the line 48 to indicate the length of piping being drawn. After moving the desired direction and length, the user clicks on the pallet 42, and a selected fitting 47 from the tools 44 is inserted at that location. The user repeats the above drawing steps until the user reaches the end of the segment and double clicks on the pallet 42 to enter the ending node point (e.g., outlet 33).

After constructing the 3-D segment model 46 for the selected segment, the user returns to the 2-D system model 30 in FIG. 3A. Another segment can thereafter be selected in the 2-D interface 20 of FIG. 2A to access the second interface 40 of FIG. 2B and to construct or view a 3-D segment model of the newly selected segment.

When the required piping lengths and fittings have been entered for all the segments of the hydraulic system into the software application, the user accesses a hydraulic solver in the software application to perform hydraulic calculations and modeling based upon the inputted 3-D data and other relevant hydraulic data present in the model (e.g., relief valve trip pressures, etc.). The algorithms used by hydraulic solvers are well known in the art, such as Beggs, Brill and Moody; Moody; Beggs and Brill high velocity; and Lockhart and Martinelli, Berwanger NetMaster 1.0, for example, but which are incorporated herein by reference. The hydraulic solvers allow a user to determine the performance of the hydraulic system during a specific global scenario or common contingency, such as a fire. By inputting the scenario, the flow rates, fluid properties at all sources, pressures at the outlets, and other required conditions and information into the hydraulic solver, the solver can determine (for example) backpressure results, which the user can then use to determine whether the backpressures will cause a catastrophic failure, for example. As hydraulic solvers are well known, they are not further discussed.

One disadvantage of this prior art software application is that the user is unable to split a segment into two segments from the second interface 40. For example, if the user realizes that a node point (e.g., a junction) should have been located somewhere in the segment (e.g., on line 48 in FIG. 2B), the user must exit the 3-D interface 40, return to the 2-D interface 30 to add the node point to the segment (e.g., line 38), and return to the 3-D interface 40 to reenter segment information. In another disadvantage, the user may find it difficult to move the mouse pointer 41 to draw the precise length of piping. Consequently, the user may simply approximate piping lengths while constructing the segment with the mouse pointer 41 and may use a dialog window (not shown) to manually enter the actual piping lengths for the segment.

Perhaps more importantly, constructing a 3-D segment model 46 of FIG. 2B for each segment of a hydraulic system can still produce errors in the entire system model, and accordingly can produce errors in the hydraulic calculations based on such an erroneous model. For example, when constructing a 3-D segment model 46 for a given segment, the user is not provided feedback whether the pipe lengths, 3-D orientations, etc. are physically accurate in light of the entirety of the hydraulic system. This is because the user can only view one 3-D segment model 46 at a time in the second interface 40 of FIG. 2B, and cannot view two or more adjoining 3-D segment models 46 together in a 3-D context. The only other avenue for viewing the entirety of the hydraulic system, or multiple segments, is provided by the a 2-D interface of FIG. 2A, which (like a typical circuit schematic) indicates the positions and lengths of the segments in only a functional, non-physical manner. Therefore, it is possible for the user to produce unrecognized errors which respect to the 3-D layouts of the segments. For example, a portion of one segment may inadvertently occupy the same physical location as another segment. For example, valve 34 in FIG. 2A (segment 39) may occupy the same 3-D space as the outlet 33 (segment 38) because the user has entered an incorrect pipe length or orientation in one of the segments 38 or 39. This might never be noticed by the user, and as a result any calculations performed using the 3-D modeling information, which necessarily relies on the 3-D data from input for each of the segments, would likely be incorrect.

Without the ability to view the 3-D system model of the entire hydraulic system (or at least two adjoining 3-D segment models), the user is offered no visual feedback of such an error. Having two elements occupy the same space is not physically possible, and any hydraulic calculations performed on an incorrect model will produce erroneous results as just noted. Therefore, a need exists in the art of hydraulic modeling for a software application that allows a user to construct a model efficiently, and in a manner that reduces errors such as those just noted. The subject matter of the present disclosure is directed to overcoming, or at least reducing the effects of, one or more of the problems set forth above.

SUMMARY OF THE DISCLOSURE

A software application implementable on a computer system is used to create a model of a hydraulic system to perform calculations. The user visually constructs a two-dimensional (2-D) connectivity model in the computer system. The 2-D connectivity model has a plurality of node points defined at various elements (sources, outlets, equipment, and junctions) of the hydraulic system and has segments interconnecting the node points. The user visually constructs a three-dimensional (3-D) segment model for each segment so that each segment model has the 3-D layout of the piping and the fittings for the segment. A 3-D system model of the entire hydraulic system is visually created in the computer system by combining the 3-D segment models. The software application performs calculations using the 3-D system model, and the 3-D system model can be visually or automatically verified to determine whether the model substantially corresponds to the 3-D layout of the hydraulic system, and has been laid out without errors.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
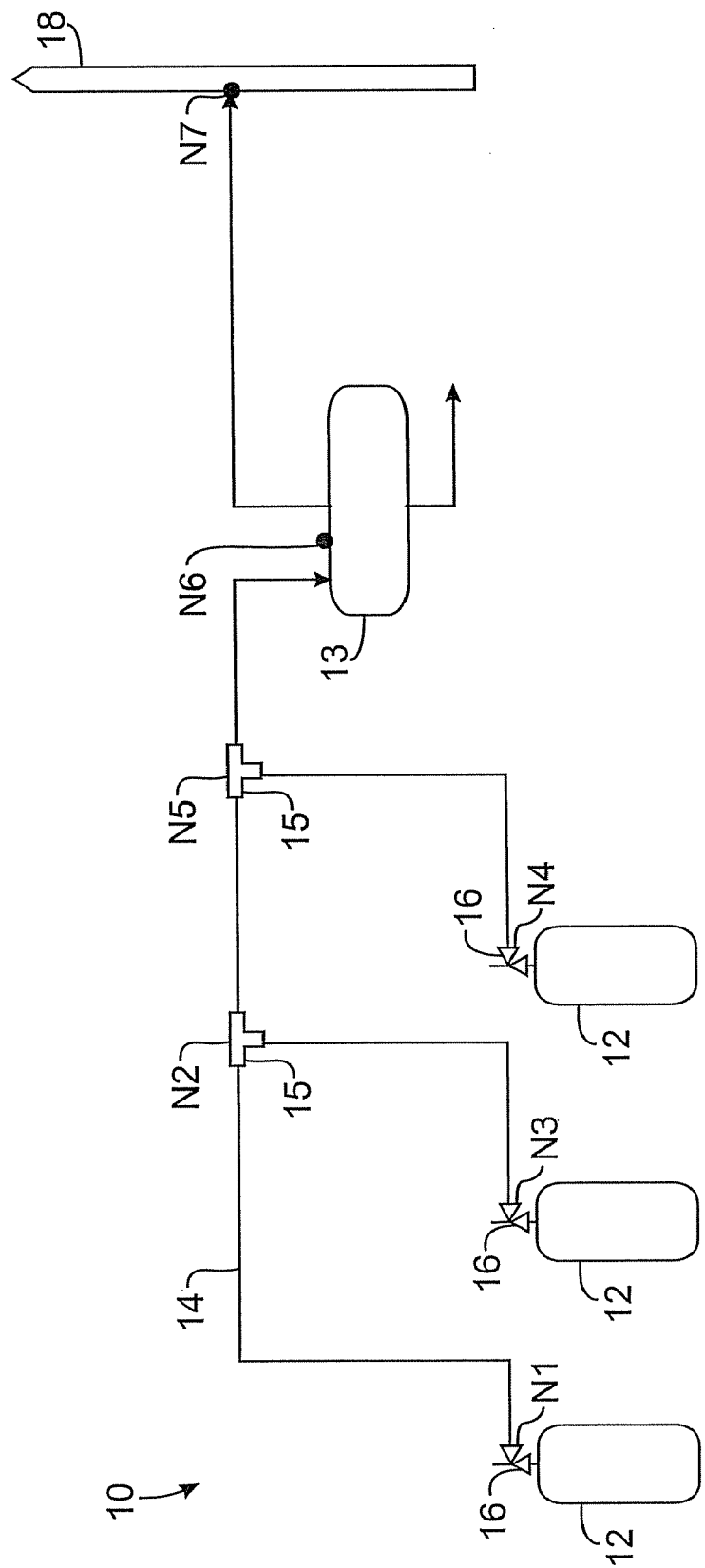
FIG. 1 illustrates an example of a hydraulic system.

While the disclosed software application is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Figure 2A:
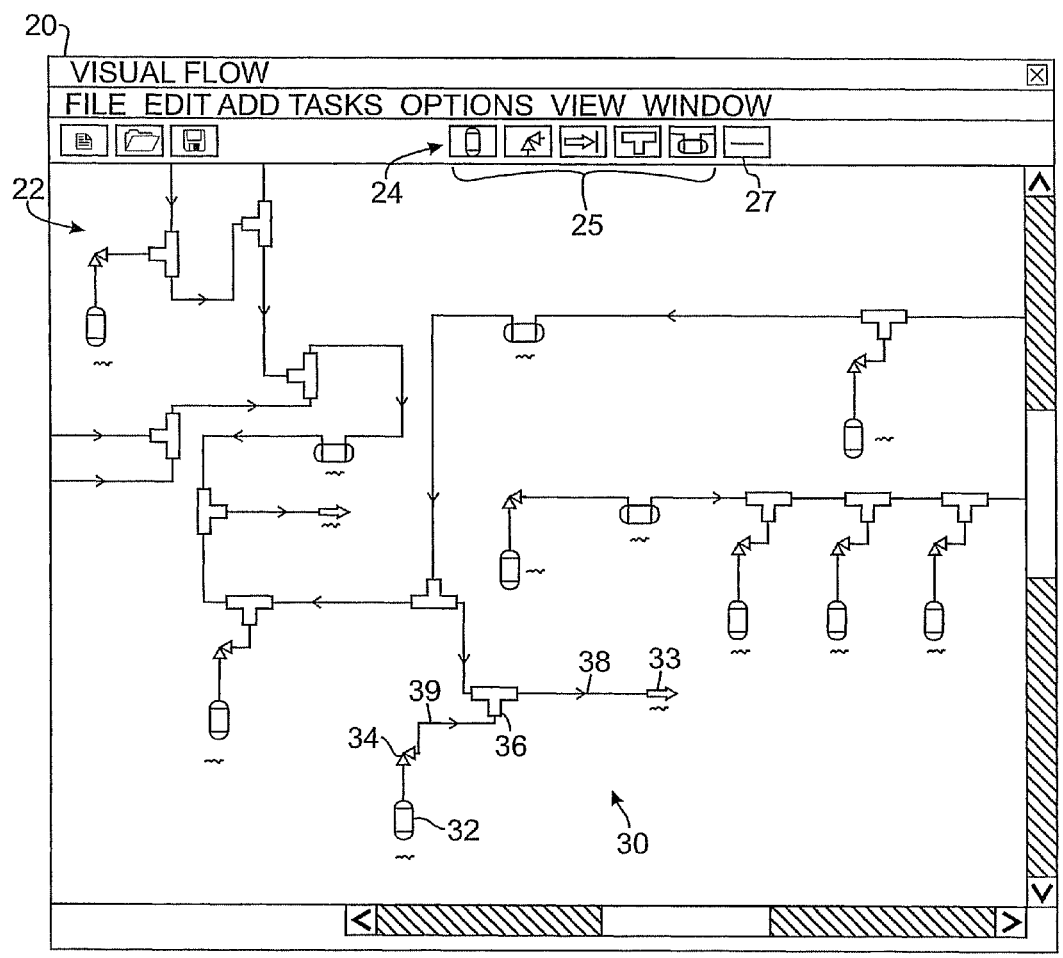
FIG. 2A illustrates an interface of a prior art software application for constructing a two-dimensional model of the hydraulic system.
Figure 3:
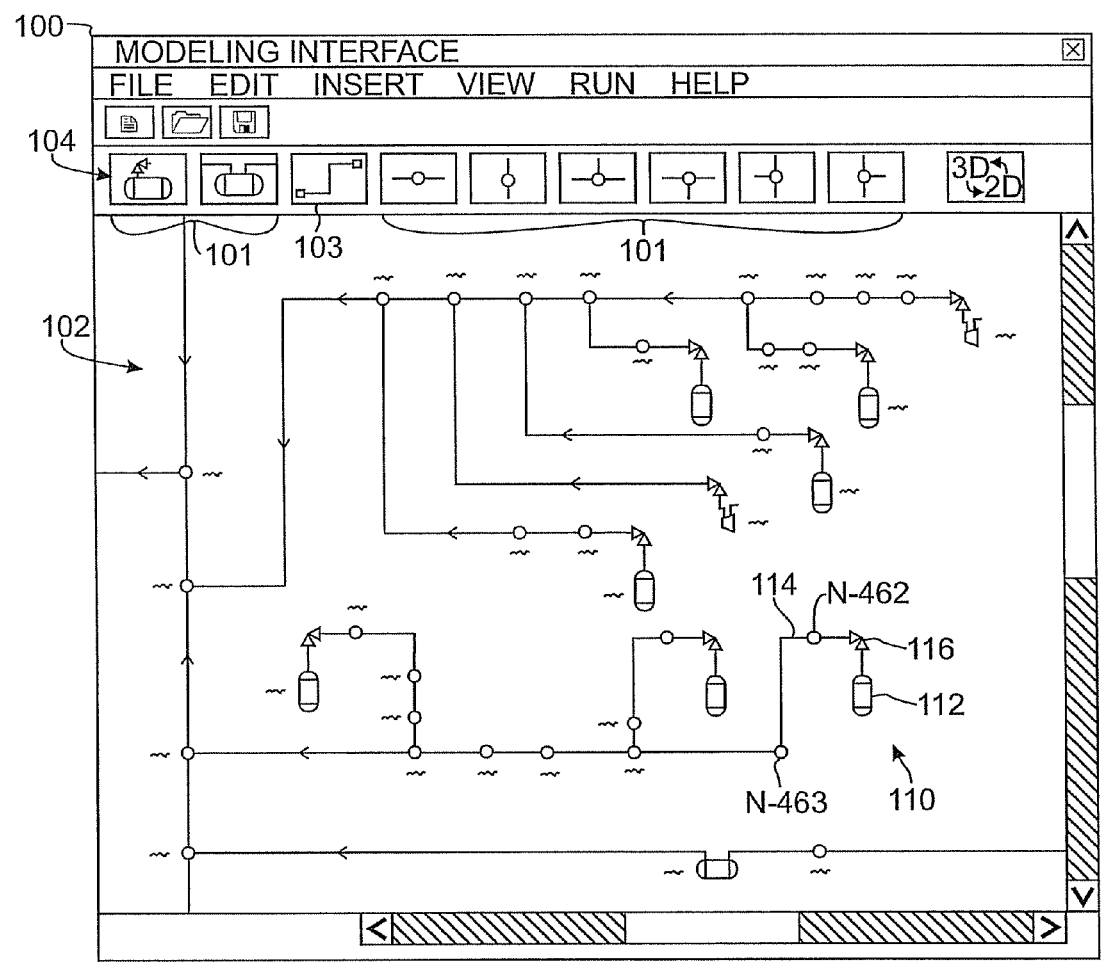
FIG. 3 illustrates an interface of a software application for constructing a two-dimensional connectivity model of a hydraulic system according to certain teachings of the present disclosure.

Referring to FIG. 3, an interface 100 of a software application according to certain teachings of the present disclosure is illustrated. Interface 100 and its associated palette 102 are essentially similar in function to that discussed with respect to FIG. 2A above. Using interface 100, a user constructs a 2-D connectivity model 110 of a hydraulic system, again using CAD drawings of the system for example. When constructing the model 110, the node-segment convention discussed above is used. Thus, the node points entered in this 2-D connectivity model 110 include elements of the system such as sources, outlets, equipment, and junctions. In the present embodiment, locations of the system where a change in orifice occurs (e.g., enlargements, contractions, changes in pipe diameters, etc.) are also preferably defined as node points, although this is not strictly required. Segments are once again defined as the collection of piping and fittings between the node points, and are simply represented by connective lines (e.g., 114) between node points (e.g., N-462 and N-463) in the 2-D connectivity model 110. The user does not using interface 100 enter pipe lengths, fitting types, changes in elevation or orientation, changes in diameters, or other detailed information related to the segments between node points. Instead, relevant details for the segments are added to the model 110 using the interface discussed below with reference to FIGS. 4-6.

As with the prior art, the interface 100 includes a plurality of tools 104 on a toolbar for constructing the model 110, which includes node tools 101 to add node points (e.g., elements including sources, outlets, equipment, expansions, contractions, and junctions) and a segment tool 103 to add the segments between node points. A dialog window (not shown) appears, and the user enters the type of source, tag number, and other information pertinent to the hydraulic calculations to be eventually performed by the solver which interfaces with the application program. Again, interface 100 is substantially similar to the prior art.

Figure 2B:
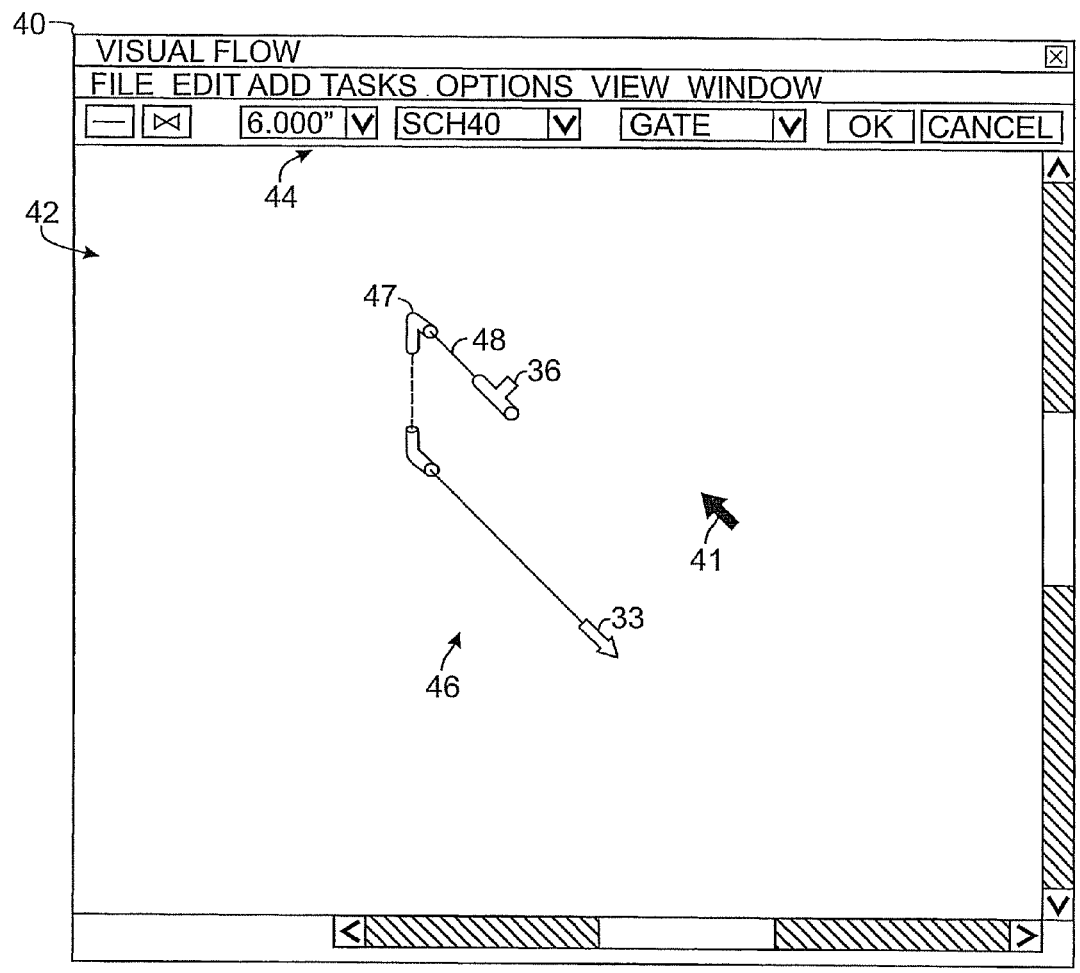
FIG. 2B illustrates an interface of the prior art software application for constructing a three-dimensional model of a segment of FIG. 2A.
Figure 4:
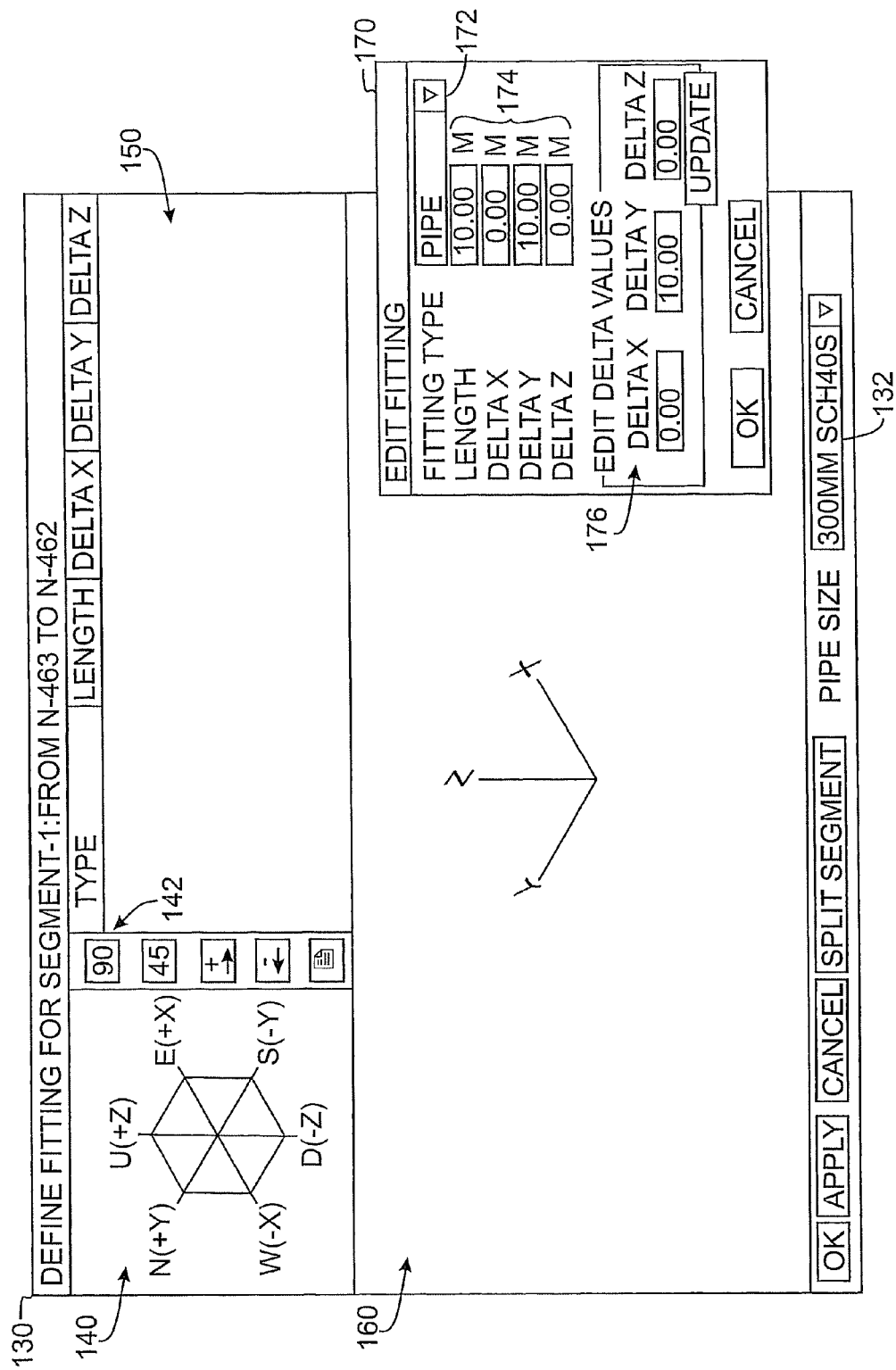
FIGS. 4-6 illustrate another interface of the disclosed software application for constructing a three-dimensional segment model of a segment of FIG. 3.

To add detailed 3-D information to a segment, the user selects a segment in the 2-D connectivity model 110 (e.g., by double clicking on the line 114 in the pallet 102). As a result, a segment modeling interface 130 shown in FIG. 4 is generated, which allows the user to construct a 3-D segment model (not shown) of the selected segment. Interface 130 is similar in function to interface 40 of FIG. 2B, but has differences and additional features worth discussing. The interface 130 includes an orientation section 140, an element section 150, and a viewer 160. The orientation section 140 allows the user to select the orientation or direction of sections of piping for the selected segment (e.g., along +/−X, Y and Z-axes, or east/west, north/south, and up/down). The element listing 150 lists details of the various piping and fittings the user has entered for the selected segment, as illustrated subsequently in FIGS. 5 and 6. The viewer 160 shows a 3-D view of the constructed model.

To begin constructing the 3-D segment model, the user first selects a pipe size and schedule for the selected segment from a dropdown 132 that lists various available options. Then, the user selects an orientation from the axis in the orientation section 140. The axis can be set to a 45 or 90-degree orientation using buttons 142. The 90-degree orientation allows the user to select only cardinal angles when constructing the 3-D segment model, while the 45-degree orientation allows the user to select compound angles. In the present example, the user has selected the southerly direction (−Y) at 140, which brings up an "Edit Fitting" dialog box 170. In the dialog box 170, the user selects the type of fitting to be entered from a dropdown 172 and enters any relevant details for the fitting in text fields 174. The types of fittings in the dropdown 172 can include pipe, ANSI contraction, ANSI enlargement, flange (Branch), flange (line), outlet, sudden contraction, screw tee (branch), screw tee (line), and sudden enlargement. Other fittings, such as elbows, can be automatically added. These are common fitting types used for a hydraulic system, such as the exemplary relief system described earlier. However, it will be appreciated that other types of hydraulic systems may use other types of fittings particular to their implementations. Because contraction, enlargement, and tee fittings are defined as node points in a preferred embodiment, these fitting types will be located at an end of the segment when constructed.

In the dialog box 170, the user has selected "Pipe" as the type of fitting from the dropdown 172 and has entered a pipe length of 10-m in text field 174. The delta values (i.e., the XYZ coordinates in the interface 130) of the piping are automatically updated based on the orientation selected in the orientation section 130 and the length of pipe entered in field 174. The user can also edit the delta values using the text fields 176 of the dialog 170.

Figure 5:
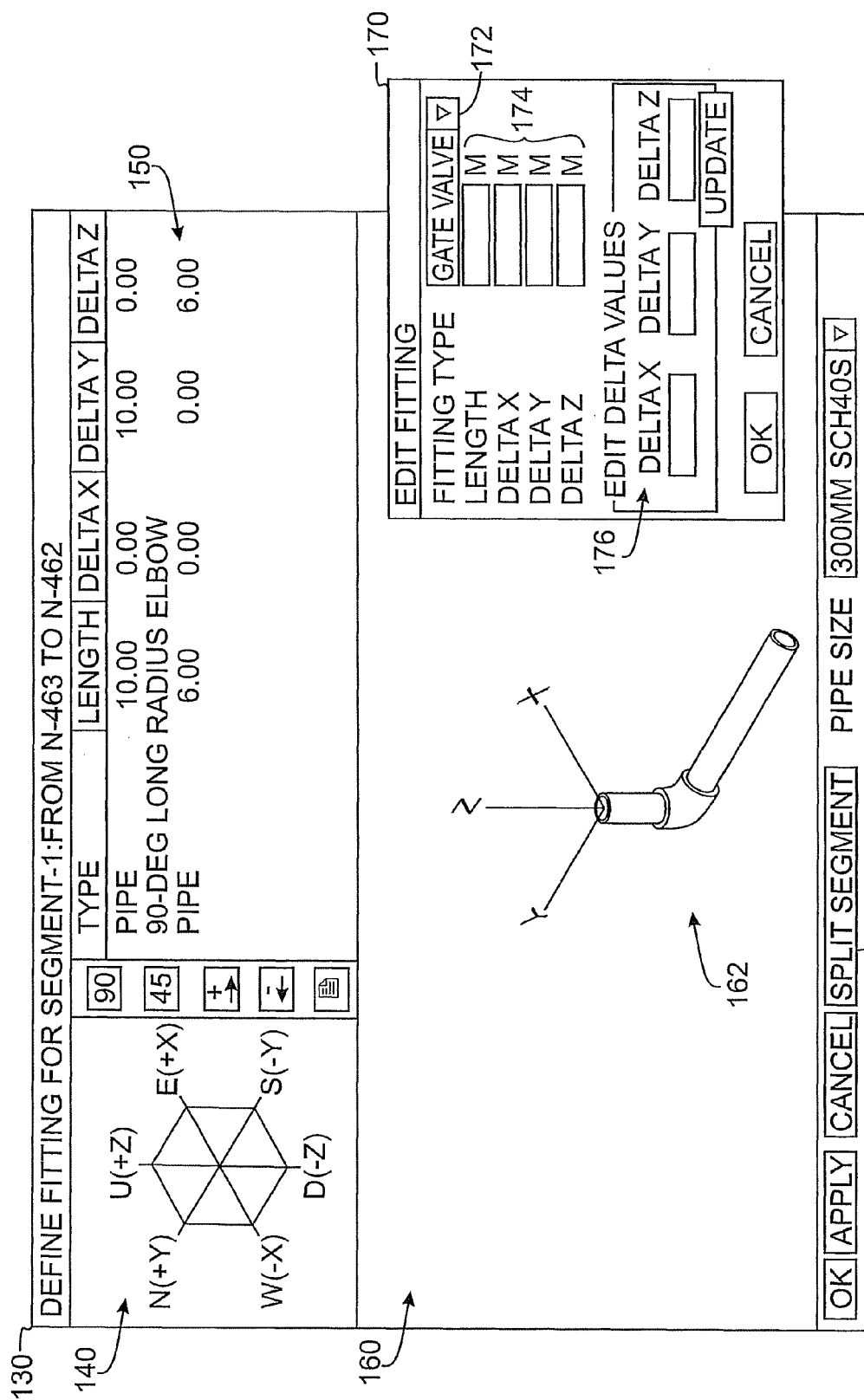

Once the details of the fitting have been entered, the user selects "OK" in the dialog 170, the fitting and its details are automatically listed in the fitting section 150, and the fitting is displayed in the viewer 160, as shown in FIG. 5. The user can then add other fittings to construct the 3-D segment model 162 based on the isometric drawing of the hydraulic system. In FIG. 5, the user has next selected an upwards direction (+Z) in the orientation section 130 and has entered a pipe having a six meter length in the dialog 170. The interface 130 thus automatically inserts a 90-degree long radius elbow between the six meter and ten meter orthogonal sections of piping. Unlike the prior art software application noted in the background section of the present disclosure (i.e., FIG. 2B), the pipes of the 3-D segment model 162 are not displayed simply as lines, but with a realistic look. Thus, the pipes and fittings in the viewer 160 preferably have solid form and are shaded so that the viewer 160 gives the user a realistic representation of the constructed segment.

Figure 6:
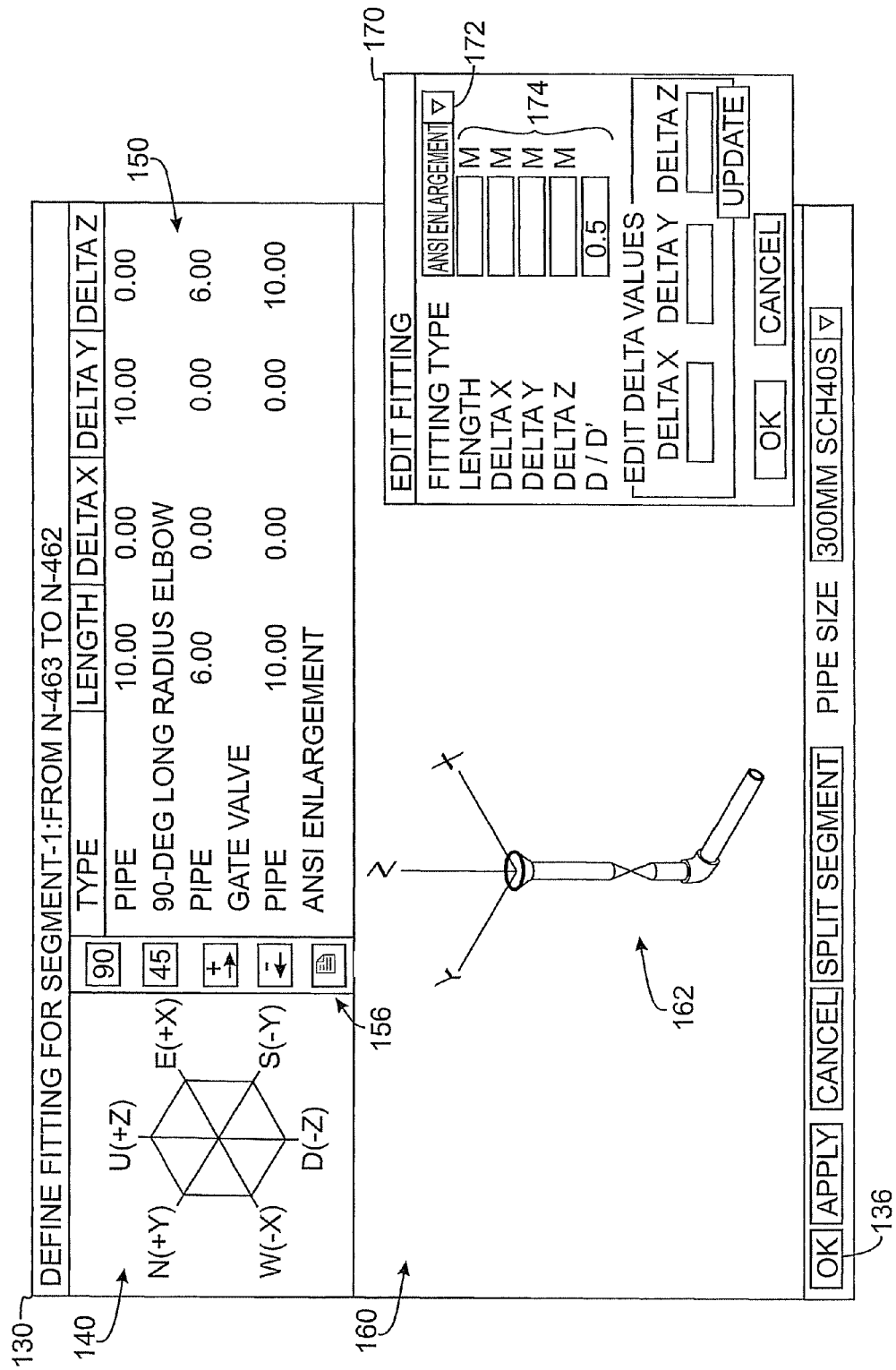

While constructing the 3-D segment model 162, the user may realize that a fitting (e.g., a gate valve) should have been placed in the segment. To insert a fitting in the 3-D segment model 162, the user highlights the desired location in the list of fittings in the fitting section 150 and selects one of the buttons 156 to insert a fitting, as shown in FIG. 6. The buttons 156 also allow the user to remove a fitting from the list or to edit a fitting in the list.

While constructing the 3-D segment model 162, the user may also realize that a node point (e.g., a junction or tee) should have been placed within the segment. To enter a node point in the 3-D segment model 162 and thereby split the model 162 into two segments, the user highlights the desired location for the node point on the list of fittings in the fitting section 150 and selects the "Split Segment" button 134. As a result, a new node point (e.g., junction) is added at that location, and the current segment is divided into two segments. The new node point is also automatically added to the 2-D connectivity model 110 of FIG. 3, and the piping and fitting information already entered is stored in the new, split segments.

Referring to FIG. 6, a final fitting of the 3-D segment model 162 is entered into the 3-D segment model 162. In the dialog box 170, the user has selected an ANSI enlargement in the drop down 172 and has entered a 0.5 change in diameter, which represents the ratio of the piping diameter in the present segment over the new diameter of piping in the next segment. When the 3-D segment model 162 is completed, the user selects the OK button 136 on the interface 130, and the 3-D segment model 162 is stored as part of the overall 3-D model of the hydraulic system. The user returns to the previous interface 100 of FIG. 3 and if necessary selects another segment from the model 110 to construct that next segment in 3-D detail as discussed above in FIGS. 4-6.

Figure 7:
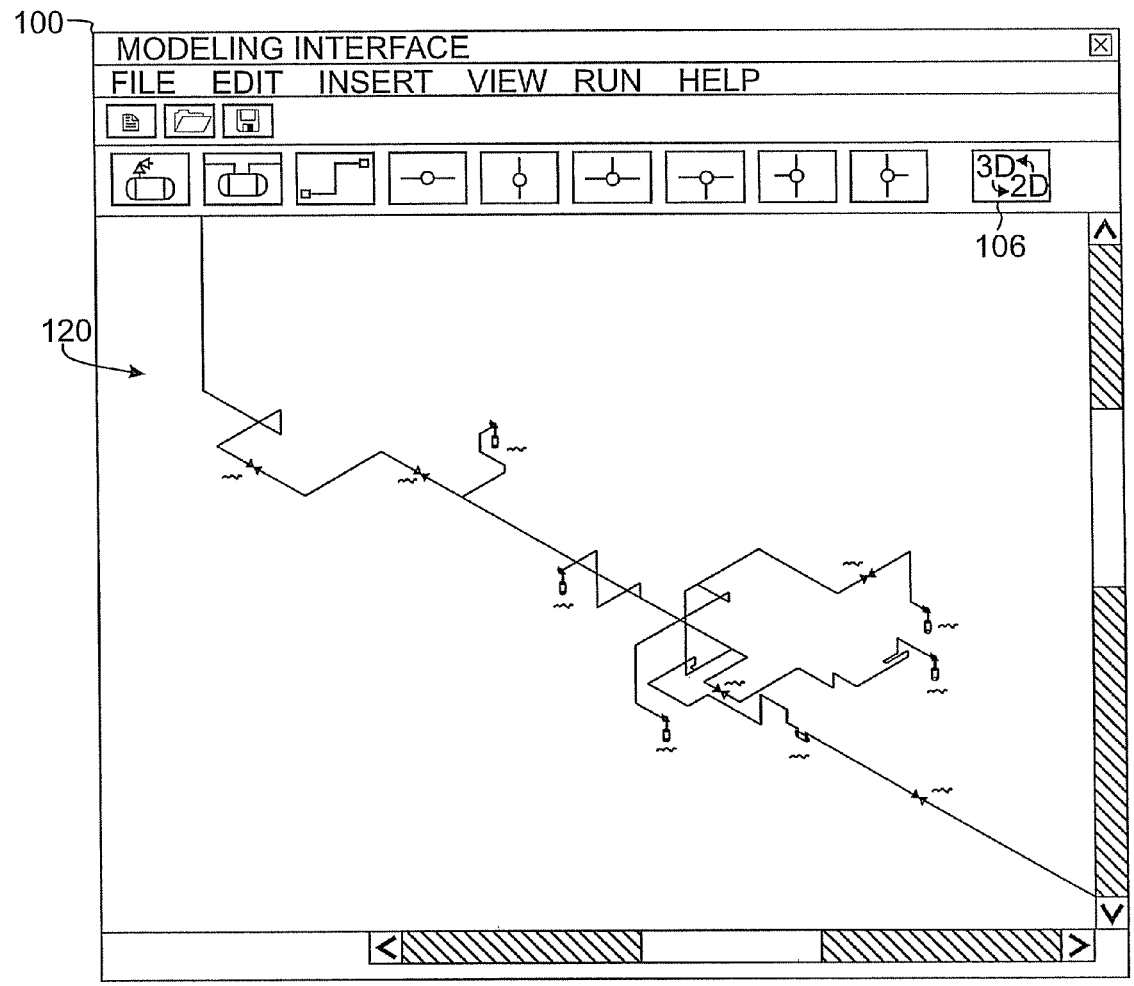
FIG. 7 illustrates an interface of the disclosed software application for displaying a three-dimensional system model of the entire hydraulic system.

Once each of the segments in the hydraulic system have been three-dimensionally constructed, the user can view the overall model in three-dimensions for further visual affirmation that the model is complete and precise. Referring to FIG. 7, the interface 100 is illustrated with the view toggled from 2-D to 3-D by button 106 on the tool bar so that a 3-D illustration 120 of the entire hydraulic system (or at least a plurality of the segments) is shown in pallet 102. To construct the 3-D system model 120, the separate previously-stored 3-D segment models 162 (e.g., Fig.) are combined together by stacking their fittings, piping, delta values, and orientations in an integrated 3-D view. As one skilled in the art understands, this is accomplished by taking the XYZ coordinates of the elements of a particular segment, establishing an origin at one of the nodes in that segment, shifting the XYZ coordinates of a connecting segment via that origin, etc. The displayed 3-D system model 120 can be displayed either in a realistic visual form (such as is used to view the segment models 162 in interface 130 of FIGS. 4-6), or in a more simplistic manner such as by using lines, cylinders, boxes, etc.

The 3-D system model 120 enables the user to visually verify that piping, sources, outlets, etc., of different segments of the system do not occupy the same 3-D location in the model 120, which would indicate an error in the model 120. Moreover, the user can visually compare the 3-D system model 120 of the entire system to the isometric drawing of the system (e.g., the CAD file used as the input to the model) to verify the accuracy of the model 120. This visual verification helps ensure that the lengths of various pipes, the routing of piping around equipment, and the three-dimensional layout are correct and that any hydraulic calculations performed on the model 120 will accordingly be accurate.

In addition to visual verification, the software application can automatically determine whether a portion of one segment occupies the same location (XYZ coordinates) of another portion in the system model. This is accomplished by assessing the XYZ coordinates of the model 120, including the shifted coordinates for segment models 162, and assessing whether any given coordinates are redundantly represented. Alternatively, very near proximity of XYZ coordinates of given segments (e.g., within an inch) can also indicate a potential problem.

A potential error can be automatically indicated in several different ways. Thus, having knowledge of the XYZ coordinates, a comparison of coordinates can be performed when each segment is being constructed (FIGS. 4-6), and a warning may be textually or graphically generated within interface 130 to indicate the conflicting portion of the newly entered segment. Alternatively, conflicting portions of segments can be textually graphically indicated in either the 2-D connectivity model 110 (FIG. 3) or the 3-D system model 120 (FIG. 7). For example, conflicting portions can be highlighted red on the interface 100 to visually notify the user of the error.

Once the overall model 120 is completed in three dimensions, and any potential problems fixed if necessary, the user can access a hydraulic solver such as those disclosed earlier that is linked to the software application. By way of review, the hydraulic solver uses the 3-D system information from the model 120 and fluid dynamic equations to calculate backpressures and other information to allow the user analyze the hydraulic system. Again, such calculations are better guaranteed to be accurate once potential problems in the 3-D layout have been identified and addressed as discussed above.

The foregoing amply illustrates to a computer programmer of skill how to make and use the disclosed software application and its accompanying user interfaces and other functional aspects. Therefore, programming of the disclosed user interfaces and implementing its functional aspects would be a routine matter to a computer programmer of skill and can be accomplished with many different programming languages and within the context of many different operating systems. Of course, the computer coding for the disclosed software application would be stored on a computer-readable media, such as a compact disk, a tape, stored in a volatile or non-volatile memory, etc.

The foregoing description of preferred and other embodiments is not intended to limit or restrict the scope or applicability of the inventive concepts conceived of by the Applicant. In exchange for disclosing the inventive concepts contained herein, Applicant desires all patent rights afforded by the appended claims. Therefore, it is intended that the appended claims include all modifications and alterations to the full extent that they come within the scope of the following claims or the equivalents thereof.

What is claimed is:

1. A method implemented in a computer system for creating a three-dimensional system model of a hydraulic system, comprising:
(a) constructing a two-dimensional (2D) connectivity model in a computer system, wherein the 2D connectivity model comprises a plurality of node points and a plurality of segments interconnecting the node points using a node-segment convention for the hydraulic system;

(b) constructing a three-dimensional (3D) segment model for each of said plurality of segments of the two-dimensional (2D) connectivity model by receiving a selection of a segment in the two-dimensional (2D) connectivity model and launching a segment modeling interface for the selected segment, to construct the 3D segment model by:

(i) receiving an orientation for the selected segment;

(ii) receiving fitting information for the selected segment and building a list of pipes and fittings in a fittings section corresponding to the constructing of the 3D segment model;

(iii) generating 3D coordinates for the selected segment based on the orientation and the fitting information; and (iv) while constructing the selected segment, automatically determining by the computer system whether the 3D coordinates for the selected segment conflict with a previously constructed 3D segment model by comparing respective 3D coordinates and indicating a conflicting portion in an error warning output to the user when a conflict having been determined, thereby reducing a potential for errors in subsequent hydraulic calculations;

(c) constructing a 3D system model of the hydraulic system by combining each 3D segment model constructed in step (b) in an integrated 3D view;

wherein step (b) further comprising splitting a selected 3D segment model into two split 3D segment models, upon receiving a user-selection of a position in the list of pipes and fittings in the fittings section, by inserting a junction at a location in the selected 3D segment model corresponding to the position in the list to split the selected 3D segment model into two split 3D segment models.

2. The method of claim 1 wherein the node points are defined for elements of the hydraulic system and the segments are defined for fittings and piping of the hydraulic system between the node points.

3. The method of claim 1 wherein the (2D) connectivity model is constructed via a first graphical-user interface.

4. The method of claim 1 wherein the segment modeling interface comprises an orientation section, the fitting section, and a viewer.

5. The method of claim 1 wherein step (b) of constructing a three-dimensional (3D) segment model further comprises receiving a pipe size for the selected segment.

6. The method of claim 1 wherein the orientation for the selected segment is received in an orientation section via receiving a selection of an axis, wherein the axis comprises a 45 degree orientation or a 90 degree orientation, allowing selection of compound angles and cardinal angles, respectively.

7. The method of claim 1 wherein generating 3D coordinates for the selected segment based on the orientation and the fitting information comprises automatically updating delta values representing 3D coordinates.

8. The method of claim 7 further comprising receiving edits to the delta values representing 3D coordinates from a user via the segment modeling interface.

9. The method of claim 1 wherein step (b) of constructing a three-dimensional (3D) segment model further comprises displaying the fitting information for the selected segment in a list in an element section of the segment modeling interface.

10. The method of claim 1 wherein step (b) of constructing a three-dimensional (3D) segment model further comprises displaying in a 3D view the 3D segment model in a viewer of the segment modeling interface.

11. The method of claim 1 wherein step (b) of constructing a three-dimensional (3D) segment model further comprises storing the 3D segment model.

12. The method of claim 1 further comprising accessing a hydraulic solver to perform hydraulic calculations based on the constructed 3D system model of the hydraulic system.

13. The method of claim 1 wherein automatically determining by the computer system whether the 3D coordinates for the selected segment conflict with a previously constructed 3D segment model comprises assessing whether 3D coordinates occupy the same location or are of a near proximity to indicate a potential problem.

14. The method of claim 1 wherein step (b) of constructing a three-dimensional (3D) segment model further comprises inserting a fitting in the 3D segment model by receiving a user-selection of a desired position in the list of pipes and fittings in the fittings section and inserting the fitting at a location in the 3D segment model corresponding to the desired position in the list.

15. The method of claim 1 wherein step (b) of constructing a three-dimensional (3D) segment model further comprises deleting a fitting in the 3D segment model by receiving a user-selection of a fitting in the list of pipes and fittings in the fittings section and deleting the fitting at a location in the selected 3D segment model corresponding to the selected fitting in the list.

16. A method implemented in a computer system for creating a three-dimensional (3D) system model of a hydraulic system, comprising:

(a) constructing a two-dimensional (2D) connectivity model in a computer system via a first graphical-user interface, wherein the 2D connectivity model comprises a plurality of node points defined for elements of the hydraulic system and a plurality of segments interconnecting the node points using a node-segment convention;

(b) constructing a three-dimensional (3D) segment model for each of said plurality of segments of the two-dimensional (2D) connectivity model by receiving a selection of a segment in the two-dimensional (2D) connectivity model and lunching a segment modeling interface for the selected segment, wherein the segment modeling interface comprises an orientation section, a fitting section, and a viewer to construct the 3D segment model by:

(i) receiving a pipe size for the selected segment;

(ii) receiving an orientation in the orientation section for the selected segment;

(iii) receiving fitting information for the selected segment;

(iv) automatically updating delta values representing 3D coordinates for the selected segment based on the orientation and the fitting information;

(v) while constructing the selected segment, automatically determining by the computer system whether the 3D coordinates for the selected segment conflict with a previously constructed 3D segment model by comparing respective 3D coordinates and indicating a conflicting portion in an error warning output to the user when a conflict having been determined, thereby reducing a potential for errors in subsequent hydraulic calculations;

(vi) building and displaying the fitting information for the selected segment in a list of pipes and fittings in the fittings section corresponding to the constructing of the 3D segment model;

(vii) displaying the 3D segment model in the viewer in a 3D view;

(c) constructing a 3D system model of the hydraulic system by combining each 3D segment model constructed in step (b) in an integrated 3D view;

wherein step (b) further comprising splitting a selected 3D segment model into two split 3D segment models, upon receiving a user-selection of a position in the list of pipes and fittings in the fittings section, by inserting a junction at a location in the selected 3D segment model corresponding to the position in the list to split the selected 3D segment model into two split 3D segment models.

17. The method of claim 16 wherein step (b) of constructing a three-dimensional (3D) segment model further comprises inserting a fitting in the 3D segment model by receiving a user-selection of a desired position in the list of pipes and fittings in the fittings section and inserting the fitting at a location in the 3D segment model corresponding to the desired position in the list.

18. A non-transitory computer-readable medium for creating a three-dimensional (3D) system model of a hydraulic system having computer-executable instructions thereon for causing a computer to perform the steps recited in claim 1.

* * * * *